United States Patent
Tucker et al.

(10) Patent No.: US 12,290,893 B2
(45) Date of Patent: May 6, 2025

(54) TEMPERATURE CONTROL IN MACHINE TOOLS

(71) Applicant: Fives Landis Limited, Keighley (GB)

(72) Inventors: Matthew Tucker, Bedford (GB); Michael Pierse, Bedford (GB); Benjamin Pike, Milton Keynes (GB)

(73) Assignee: Fives Landis Limited, Keighley (GB)

( * ) Notice: Subject to any disclaimer, the term of this patent is extended or adjusted under 35 U.S.C. 154(b) by 450 days.

(21) Appl. No.: 17/770,454

(22) PCT Filed: Oct. 29, 2020

(86) PCT No.: PCT/GB2020/052732
§ 371 (c)(1),
(2) Date: Apr. 20, 2022

(87) PCT Pub. No.: WO2021/084253
PCT Pub. Date: May 6, 2021

(65) Prior Publication Data
US 2022/0379422 A1    Dec. 1, 2022

(30) Foreign Application Priority Data

Nov. 1, 2019 (GB) .................................... 1915900
Jun. 1, 2020 (GB) .................................... 2008179

(51) Int. Cl.
*F25B 21/00* (2006.01)
*B23Q 11/14* (2006.01)
*G05D 23/19* (2006.01)

(52) U.S. Cl.
CPC ....... *B23Q 11/141* (2013.01); *G05D 23/1931* (2013.01); *F25B 21/00* (2013.01)

(58) Field of Classification Search
CPC ......... F25B 21/00; F25B 21/02; B23Q 11/141
See application file for complete search history.

(56) References Cited

U.S. PATENT DOCUMENTS 5,476,137 A    12/1995 Ochiai et al.
6,827,142 B2   12/2004 Winkler et al.
(Continued)

FOREIGN PATENT DOCUMENTS

EP    1239156 A1    9/2002
EP    3262476 B1    5/2019
(Continued)

OTHER PUBLICATIONS

Machine-generated English language abstract of Japan Patent Publication No. JP S60167745 A, downloaded from patents.google.com on Apr. 11, 2022.
(Continued)

*Primary Examiner* — Nael N Babaa
(74) *Attorney, Agent, or Firm* — Kolitch Romano Dascenzo Gates LLC (57) ABSTRACT

A fluid temperature control apparatus in combination with a machine tool, wherein the apparatus is arranged to adjust the temperature of a fluid being supplied to the machine tool. The apparatus comprises a temperature control assembly for adjusting the temperature of the fluid as it passes through the assembly. The assembly comprises at least one thermoelectric temperature control device.

20 Claims, 6 Drawing Sheets

(56) References Cited

U.S. PATENT DOCUMENTS

| | | | |
|---|---|---|---|
| 2001/0001924 A1 | 5/2001 | Maehashi | |
| 2010/0071384 A1* | 3/2010 | Lu | F25D 15/00 62/3.2 |
| 2018/0039293 A1 | 2/2018 | Pierse | |
| 2019/0310033 A1* | 10/2019 | Li | F25B 39/00 |

FOREIGN PATENT DOCUMENTS

| | | |
|---|---|---|
| GB | 2114924 A | 9/1983 |
| GB | 2535707 A | 8/2016 |
| GB | 2563716 A | 12/2018 |
| JP | S60167745 A | 8/1985 |
| JP | H10230435 A | 9/1998 |
| JP | 2000266039 A | 9/2000 |
| JP | 2003165038 A | 6/2003 |
| JP | 2004042144 A | 2/2004 |
| KR | 1020190035074 A | 4/2019 |
| KR | 1020190046451 A | 5/2019 |
| KR | 1020190110234 A | 9/2019 |
| WO | WO 2018/178261 A1 | 10/2018 |

OTHER PUBLICATIONS

Machine-generated English language translation of Japan Patent Publication No. JP H10230435 A, downloaded from patents.google.com on Apr. 11, 2022.

Machine-generated English language translation of Japan Patent Publication No. JP 2000266039 A, downloaded from patents.google.com on Apr. 11, 2022.

Machine-generated English language translation of Japan Patent Publication No. JP 2003165038 A, downloaded from patents.google.com on Apr. 11, 2022.

Machine-generated English language translation of Japan Patent Publication No. JP 2004042144 A, downloaded from patents.google.com on Apr. 11, 2022.

Machine-generated English language translation of Korea Patent Publication No. KR 1020190035074 A, downloaded from patents.google.com on Apr. 20, 2022.

Machine-generated English language translation of Korea Patent Publication No. KR 1020190046451 A, downloaded from patents.google.com on Apr. 11, 2022.

Machine-generated English language translation of Korea Patent Publication No. KR 1020190110234 A, downloaded from patents.google.com on Apr. 11, 2022.

Bryan, J.B., et al., "An Order of Magnitude Improvement in Thermal Stability with Use of Liquid Shower on a General Purpose Measuring Machine," Workshop on Precision Machining, Society of Manufacturing Engineers, St. Paul, Minnesota, May 6, 1982.

"Thermoelectric cooling," Wikipedia, accessed Oct. 2, 2019 from https://en.wikipedia.org/wiki/Thermoelectric_cooling.

Eurotherm Cascade control supplement, Model 2604/2704, http://www.eurotherm.co.uk, 2000.

Search Report issued in connection with United Kingdom Patent Application No. GB 1915900.3, United Kingdom Intellectual Property Office, Apr. 30, 2020.

Search Report issued in connection with United Kingdom Patent Application No. GB 2017173.2, United Kingdom Intellectual Property Office, Apr. 23, 2021.

* cited by examiner

TEMPERATURE CONTROL IN MACHINE TOOLS

FIELD OF THE INVENTION

The present invention relates to temperature control in machine tools, such as machine tools used to remove material from workpieces.

BACKGROUND TO THE INVENTION

Machine tools of various sizes and configurations are built to carry out material removal processes for reducing workpieces to their finished working size or to a pre-process condition in preparation for further machining. The dimensional accuracy of the machining process is dependent on a variety of factors. These factors may include position and encoding accuracy, encoder placement accuracy, Computer Numerical Control (CNC) capability, and thermal control of the machine structure and any fluid delivery systems such as for coolants and lubricants for example.

A machine base and the larger components of a machine are passive and, being generally the bulk of the machine structure, need to be held at a stable working temperature. The acceptable limit to variations from that temperature can be as small as ±0.01° C. The entire machine will typically be placed in a temperature controlled environment. However, such an environment cannot be economically, reliably or easily maintained to such a fine level of thermal stability.

A known method for maintaining a machine structure at a stable temperature is to use a temperature controlled fluid, with the fluid at the required temperature. This method has been referred to as a "Liquid Shower". The thermally stable fluid (usually oil) is caused to flow over the outer surfaces of the structure, and in some cases, through the structure. This technology is described for example in a Society of Manufacturing Engineers paper entitled "An Order of Magnitude Improvement in Thermal Stability with Use of Liquid Shower on a General Purpose Measuring Machine"; J B Bryan et al, 6 May 1982.

In active areas of a machine tool, particularly fast moving elements such as tool spindles, work spindles and axis drives, heat is generated by various means, due to energy losses in drive motors, friction between two sliding surfaces or shear in fluid films, for example. To remove heat from these regions, and to prevent the heat entering the dimensionally critical regions of the machine (for example the base), a temperature controlled fluid may be circulated through features such as drillings or cavities in the machine to remove unwanted heat energy.

Another region where a high level of temperature control of a fluid may be required is in hydrostatic bearings. In this case, the fluid that creates the stiff bearing films within spindles and linear slide systems often flows out of the bearings and over dimensionally critical machine elements, which would again be detrimental to the machine dimensional stability if the temperature of the fluid varied from that of the machine structure. Also, the bearing fluid's temperature needs to be stable to avoid distortion through expansion or contraction which could affect the relative positions of a tool and a workpiece.

Existing temperature control techniques involve removing heat in a controlled manner with heat exchangers and chiller systems. The fluid temperature might be lowered to 1 or 2° C. below that required and then a small, accurately metered amount of heat added to trim the temperature of the fluid to its working level. The trimming might be controlled by a local feedback device or by reference to a measured temperature at the point of use of the fluid.

SUMMARY OF THE INVENTION

The present invention provides a fluid temperature control apparatus in combination with a machine tool, wherein the apparatus is arranged to adjust the temperature of a fluid being supplied to the machine tool to maintain the fluid at a setpoint temperature at a first location which is downstream of the apparatus, and the apparatus comprises:

a temperature control assembly for adjusting the temperature of the fluid as it passes through the assembly, the assembly having a fluid inlet for receiving a flow of the fluid and a fluid outlet for outputting the fluid;

a fluid conduit arrangement which is coupled to the fluid outlet to carry the fluid to the machine tool;

a first temperature sensor for outputting a first temperature signal responsive to the temperature of the fluid at the first location; and a controller configured to receive the first temperature signal and control the temperature control assembly with reference to the first temperature signal so as to maintain the fluid at the setpoint temperature at the first location, wherein the temperature control assembly comprises at least one thermoelectric temperature control device.

The use of one or more thermoelectric temperature control devices (that is, devices designed to use the thermoelectric or "Peltier" effect) in the temperature control assembly provides several benefits. They are relatively compact and therefore can facilitate fabrication of fluid temperature control apparatus which may avoid adding to the overall footprint of a machine tool. Furthermore, as a thermoelectric control device is a solid-state device, it does not have moving parts, and so is reliable and easy to maintain. Also, such devices tend to have a small thermal mass, thereby minimising their response time to correct thermal transients occurring in a fluid.

The temperature control assembly may comprise a plurality of thermoelectric control devices arranged in a two-dimensional array for example. The devices in an array are preferably equally spaced apart from each other. The number of thermoelectric temperature control devices may be selected to provide the desired heat control capability. The number of devices provided in parallel may be determined so as to be able to control expected temperature fluctuations.

In some implementations, the temperature control assembly may comprise a stack of two or more arrays of thermoelectric temperature control devices. As there may be a limit to the temperature differential that a thermoelectric temperature control device can handle, the devices may be stacked to create multi-stage or cascade configurations which can accommodate higher temperature differentials.

The fluid temperature control apparatus may control the temperature of a working fluid being fed to a machine tool with a high degree of stability. In some embodiments, the variation in the temperature of the working fluid may be controlled to better than +/− 0.005° C.

The array of thermoelectric temperature control devices may be arranged over a plane. The plane may extend parallel to the direction of fluid flow through the temperature control assembly.

The fluid temperature control apparatus may be arranged to maintain the fluid at a setpoint temperature at a first location which is downstream of the apparatus and upstream of the machine tool.

The temperature control assembly may include a thermal exchanger which forms part of a fluid path between the fluid inlet and the fluid outlet, and is thermally coupled to the at least one thermoelectric temperature control device. The thermal exchanger may define a first set of channels in the fluid path between the fluid inlet and the fluid outlet, and the fluid path may be divided between the first set of channels. The thermal exchanger may comprise a solid block (preferably a single block) of thermally conductive material (such as aluminium) which defines the channels. The set of channels may extend in parallel through the block of material.

The temperature control assembly may include an array of thermoelectric temperature control devices disposed on opposite sides of the thermal exchanger. They may be disposed in planes parallel to the direction of flow of fluid through the thermal exchanger of the assembly.

The thermal exchanger may be sufficiently robust to be able to operate over a range of fluid pressures from less than 0.1 bar to greater than 70 bar, for example. In some implementations, fluid may be supplied by the fluid temperature control apparatus at around 2 or 3 bar for coolants and lubricants, and also a high pressure for fluid bearings, up to 70 bar or greater.

An array of thermoelectric temperature control devices may be mounted on a thermal exchanger which is in the form of a laminar flow heat mixing unit.

The thermoelectric temperature control devices may trim the heat in the fluid passing through the thermal exchanger as needed to adjust its temperature at the fluid outlet of the temperature control assembly.

In a preferred embodiment, the thermal exchanger defines a second set of channels in the fluid path between the fluid inlet and the fluid outlet, the second set of channels is downstream of the first set of channels, the fluid path is divided between the second set of channels, and the thermal exchanger includes a mixing chamber located in the fluid path between the first and second sets of channels. This serves to enhance the uniformity of temperature across the fluid flow.

The temperature control assembly may include a temperature regulator for removing heat from the at least one thermoelectric temperature control device. The at least one thermoelectric temperature control device may be thermally coupled between the thermal exchanger and the temperature regulator. The temperature regulator may be thermally coupled to a face of an array of thermoelectric temperature control devices which is opposite to a face of the array which is thermally coupled to the temperature exchanger. Thus, heat energy may be extracted from or supplied to the fluid by the temperature regulator, via the thermoelectric temperature control devices.

Preferably, the temperature regulator is fluidically coupled to conduits defining a coolant fluid path for carrying coolant fluid to and from the temperature regulator. A stabilising chamber may be located in the coolant fluid path at a location upstream of the temperature regulator, wherein the stabilising chamber is arranged to increase uniformity of the temperature of coolant fluid flowing through the stabilising chamber.

Accordingly, the fluid temperature control apparatus may include a temperature regulator having an independent coolant fluid supply, which serves to enhance control of the temperature of the working fluid. Inclusion of a stabilising chamber in the temperature regulator improves the stability of the temperature of the coolant fluid supply. The coolant fluid may be a liquid, such as chilled water for example.

The apparatus may include a fluid mixing device which is downstream of the thermal exchanger and upstream of the first location. This serves to increase the uniformity of the temperature of the fluid. It may be located adjacent to the first location so that the temperature measured at the first location by the first temperature sensor more accurately reflects the temperature of the working fluid.

The controller may be configured to receive an input signal responsive to an operating parameter of the machine tool, and to control the temperature control assembly with reference to the input signal. It may adjust a target setpoint temperature with reference to the input signal. The operating parameter may be dependent on a speed of a moving element of the machine tool, for example. In some implementations, the operating parameter may be a speed of rotation of a rotary drive of the machine tool.

The level of unwanted heating can at times be predicted, for example where it is dependent on an operating parameter such as the speed of a machine spindle for example. In this case, setpoint temperature of the temperature controlling fluid can be varied to pre-empt potentially problematic heat generation.

Preferably, the system includes a fluid return path for carrying fluid from the machine tool to the fluid inlet.

A heat exchanger may be fluidically coupled into the fluid return path to transfer heat energy away from fluid flowing along the fluid return path. The coolant fluid path may include a valve for selectively diverting a proportion (or all) of the coolant flowing along the coolant fluid path to the heat exchanger to receive heat energy drawn from fluid flowing along the fluid return path.

A valve controller is preferably provided for adjusting the valve, wherein the valve controller is configured to receive a valve control signal responsive to an operating parameter of the machine tool, and to adjust the valve with reference to the valve control signal. The operating parameter may be dependent on a speed of a moving element of the machine tool, for example. In some implementations, the operating parameter may be dependent on a speed of rotation of a rotary drive of the machine tool.

An operating parameter of the machine tool may be used to predict a temperature increase in the machine tool. Accordingly, the valve may be adjusted in response thereto to counteract the heat generation. The valve may as a result divert some (or an increased) proportion of the coolant fluid flowing along the coolant fluid path to the heat exchanger to draw heat energy from fluid flowing along the fluid return path.

A second temperature sensor may be included for outputting a second temperature signal responsive to the temperature of the fluid at a second location which is in the fluid return path. The controller may be configured to receive the first and second temperature signals and control the assembly with reference to the first and second temperature signals so as to maintain the fluid at the setpoint temperature at the first location. The controller may include a cascade controller responsive to the first and second temperature signals. Such an arrangement may increase the speed of response to larger changes in the temperature of the fluid leaving the machine tool.

A fluid pump may be provided in the fluid return path. Preferably, the fluid pump is located upstream of the temperature control assembly so that any heat energy transferred to the fluid from the pump, for example due to fluid shear or pump friction, takes place before the temperature of the fluid is controlled by the temperature control assembly. The influence of the pump on the fluid temperature can therefore be minimised.

The present invention further provides a method of adjusting the temperature of a fluid being supplied to a machine tool to maintain the fluid at a setpoint temperature at a predetermined location, comprising the steps of:

receiving a flow of the fluid;

heating or cooling the fluid flow such that the setpoint temperature is maintained at the predetermined location; and feeding the fluid flow to the machine tool, wherein the fluid is heated or cooled using at least one thermoelectric temperature control device.

BRIEF DESCRIPTION OF THE DRAWINGS

A known fluid temperature control apparatus and embodiments of the invention will now be described by way of example with reference to the accompanying schematic drawings, wherein.

DETAILED DESCRIPTION OF THE DRAWINGS

Figure 1:
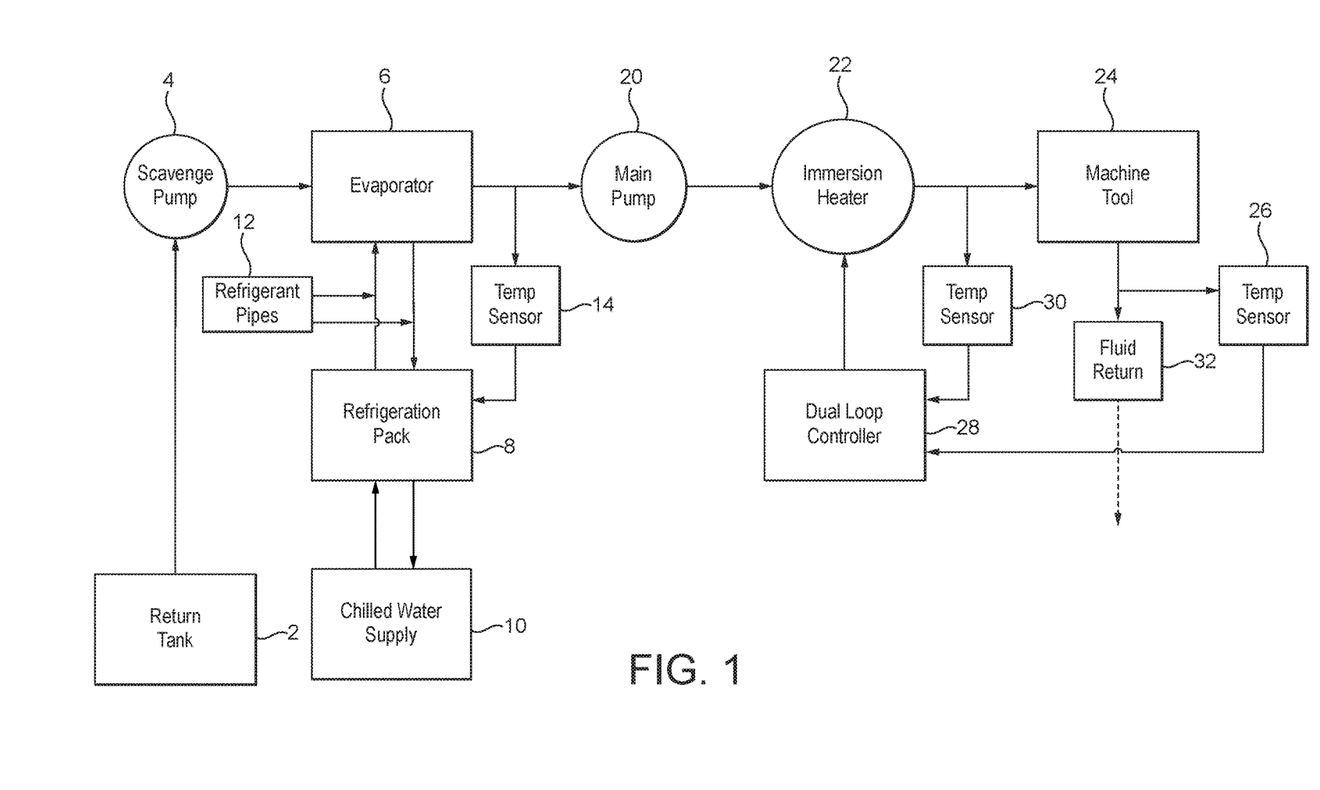
FIG. 1 is a block diagram of a known fluid temperature control apparatus.

FIG. 1 shows a known temperature control system for directly adding or removing heat to or from a working fluid. Fluid collected from a machine tool 24 is fed to a return tank 2. This fluid is then fed at a relatively low pressure (up to a few bar) by a scavenge pump 4 to an evaporator 6 of a refrigeration system. The refrigeration system includes a refrigeration pack 8 cooled by a chilled water supply 10. The refrigeration pack 8 circulates coolant to and from the evaporator 6 via refrigerant pipes 12 and controls the temperature of the coolant in response to a temperature measured downstream of the evaporator by a temperature sensor 14.

Coolant fluid from the evaporator 6 is fed by a main pump 20 at a temperature slightly below that desired at the machine tool. The fluid passes through an immersion heater 22 where heat is added to the fluid so that its temperature as it exits the machine tool 24 (as measured by temperature sensor 26) tends towards a desired temperature setting. The immersion heater may be controlled by a dual loop controller 28 in response to the temperature sensor 26 and a further temperature sensor 30 which is responsive to the temperature of the fluid as it passes from the immersion heater to the machine tool. Fluid exiting the machine tool is fed back to the return tank 2 via a fluid return system 32.

Such a system has been found to suffer from a number of drawbacks. The refrigerant pipes tend to be fragile and subject to leakage. An evaporator 6 cannot generally withstand more than a few bar of pressure without rupturing. The evaporator 6 may only be able to operate over a narrow heat range and may be difficult to adjust to match variations in fluid temperature. It may be necessary to make the fluid turbulent in the immersion heater to avoid poor heat mixing. This may itself however reduce the accuracy of control of the fluid temperature. These temperature control systems have been found to exhibit unwanted and avoidably high swings in fluid delivery temperature at a machine tool.

Figure 2:
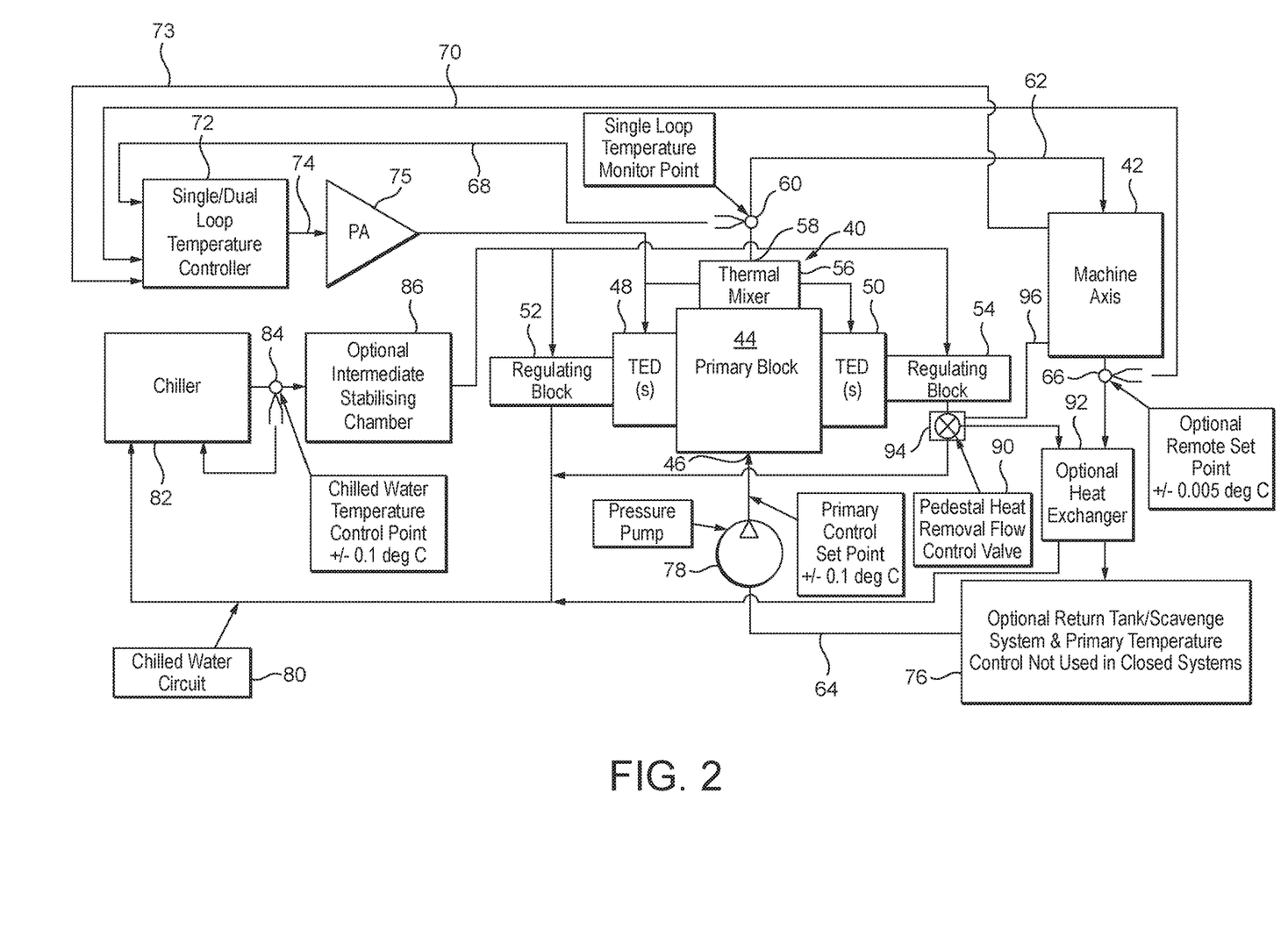
FIG. 2 is a block diagram of a machine tool and fluid temperature control apparatus in accordance with an embodiment of the invention.

FIG. 2 shows a diagrammatic representation of a fluid temperature control apparatus in combination with a machine tool according to an embodiment of the invention.

The apparatus comprises a temperature control assembly 40 for adjusting the temperature of a fluid fed to a machine axis 42 of a machine tool.

The temperature control assembly has a thermal exchanger block 44 which receives the fluid at a fluid inlet 46. Two arrays 48, 50 of thermoelectric temperature control devices are mounted against opposite sides of the thermal exchanger block 44. Each array of thermoelectric temperature control devices is located between one side of the thermal exchanger and a respective regulating block 52, 54 of a temperature regulator system.

The power rating of the thermoelectric temperature control devices may be selected to suit a particular application. For example if temperature control is achieved by the thermoelectric temperature control devices only, then higher power devices may be used. Alternatively, if the thermoelectric temperature control devices perform a temperature trimming function in a high precision system, then lower power devices may be suitable.

Thermoelectric temperature control devices (including multi-stage configurations) that may be used in embodiments of the present invention are manufactured by Laird Technologies, Inc. and marketed by Thermo Electric Devices Limited.

The thermal exchanger block is fluidically coupled to a thermal mixer or fluid mixing device 56. The fluid mixing device may have moving parts to mix the fluid or may include a consecutive series of fixed, rigid elements in the flow path which are configured to mix the fluid. A suitable device is disclosed in WO2018/178261 for example. Fluid outputted by the thermal mixer passes through a fluid outlet 58 of the temperature control assembly.

A first temperature sensor 60 is provided downstream of the fluid outlet 58. A fluid conduit arrangement 62 of pipework is coupled to the fluid outlet and is arranged to carry fluid to the machine axis 42. The first temperature sensor is responsive to the temperature of fluid flowing in the fluid conduit arrangement. A fluid return path 64 may be included to carry fluid from the machine axis to the fluid inlet 46 of the temperature control assembly.

A second temperature sensor 66 may be located in the fluid return path for monitoring the temperature of fluid leaving the machine axis.

First and second temperature signals from the first and second temperature sensors 60, 66 are fed via respective communicative couplings 68 and 70 to a single or dual loop temperature controller 72. An output signal from the controller 72 is fed along coupling 74 via a preamplifier 75 to the thermoelectric device arrays 48 and 50.

The fluid return path (if present) may include a return tank and scavenge system 76. The return path has a pressure pump 78 located upstream of the temperature control assembly 40.

The temperature regulators 52 and 54 are fluidically coupled to a chilled water circuit 80. The circuit includes a chiller 82 for cooling the water having regard to the temperature of the water outputted by the chiller, as measured by a further temperature sensor 84. The chiller may aim to control the temperature of this water to within ±0.1° C. of a desired control point. The chilled water circuit may include an optional intermediate stabilising chamber 86 downstream of the chiller. This chamber will be described in more detail below with reference to FIGS. 8 to 10.

The fluid return path from one or both regulating blocks 52, 54 to the chiller 82 may be via a pedestal heat removal flow control valve 90 in embodiments including a fluid return path 64 from the machine tool to the temperature control assembly 40. This valve may selectively divert a portion of the fluid flow via a heat exchanger 92 which thermally couples the fluid to the working fluid return path 64. This may provide an additional means via heat exchanger 92 to remove excess heat energy from the fluid leaving the machine axis 42.

The system may include a valve controller 94 for operating the flow control valve 90. The valve controller is arranged to receive a valve control signal via communicative coupling 96. The valve control signal is responsive to an operating parameter of the machine tool. In the illustrated embodiment, the valve control signal is responsive to the speed of rotation of the machine axis 42. Accordingly, the valve is adjusted by the valve controller 94 in a manner dependent on the speed of rotation of the machine axis to counteract heat generation thereby. The valve may divert some (or a greater proportion of) the coolant flowing along the coolant fluid path to the heat exchanger to draw heat energy from fluid flowing along the fluid return path.

The temperature of the fluid outputted by the temperature control assembly is monitored by the temperature sensor 60. Differences between this temperature and the desired, setpoint temperature are measured by the controller 72 which then drives the thermoelectric temperature control devices 48, 50 to either add or remove heat from the fluid flowing through the assembly as appropriate.

The second temperature sensor 66 is preferably employed in machine tools subject to substantial heat disturbance, for example tools including hydrostatic spindle bearing fluid supplies. The second temperature sensor 66 may be used to measure the fluid drain or bearing output temperature. Where two temperature sensors are deployed, the controller may include a cascade control loop. Cascade control may be included in controller nos. 2604 and 2704 marketed by Eurotherm Limited for example.

The controller 72 may receive a control input via a communicative coupling 73. This is arranged to carry a signal which is responsive to an operating parameter of the machine tool. The operating parameter may be dependent on the speed of rotation of a rotary machine axis, for example. The controller is configured to adjust its output signal along coupling 74 having regard to the operating parameter. The controller may therefore be responsive to an operating parameter of the machine tool which is indicative of or dependent on the rate of heat generation by the machine tool.

The fluid return path 64 can optionally be open, with a separate gravity-fed collection tank, or closed with only a reservoir in the return lines of a (slightly) pressurised return pipe.

The pressure pump 78 generates the fluid pressure supplied by the fluid temperature control apparatus to the machine tool. Any variations in heat generated in the pressure pump, for example fluid shear or pump friction, occur before the temperature control assembly and the assembly therefore compensates for such effects.

Figure 3:
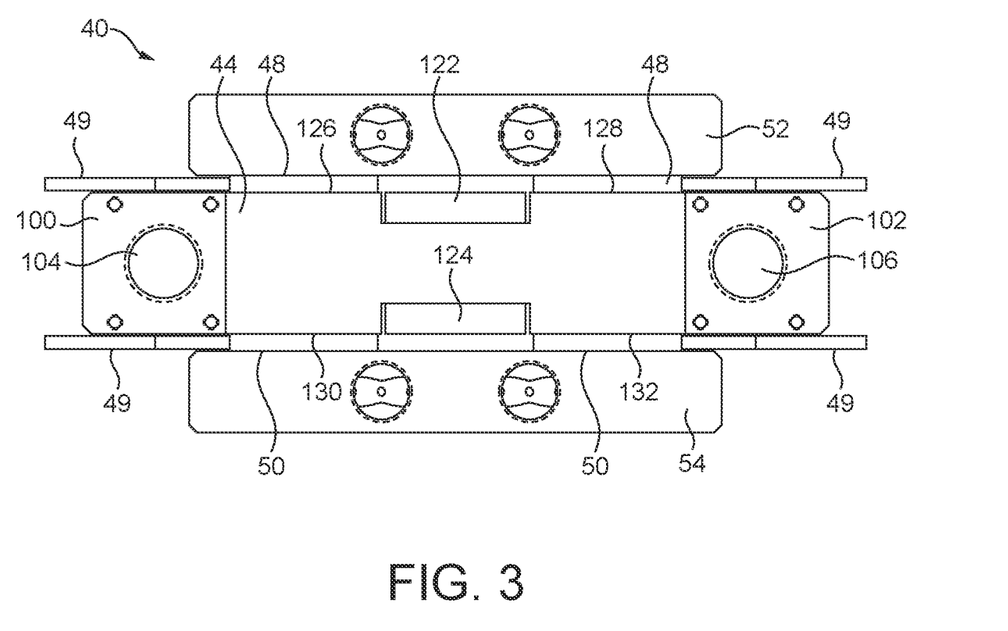
FIG. 3 is a cross-sectional side view of a temperature control assembly according to an embodiment of the invention.

FIG. 3 shows a cross-sectional side view of the temperature control assembly 40. An inlet manifold 100 and outlet manifold 102 are bolted to opposite end faces of the primary block 44. Inlet manifold 100 has a fluid inlet port 104 and outlet manifold 102 has a fluid return port 106. The primary block 44 has a central mixing chamber 120 (see FIG. 4), the upper and lower ends of which are closed by respective blanking plates 122 and 124. The blanking plates are secured to the central section of the primary block to seal the upper and lower sides of the central mixing chamber. An array of thermodynamic temperature control devices 48 is provided on each side of the upper blanking plate 122, in contact with the respective upper surface 126, 128 of the primary block. These arrays are sandwiched between the primary block and the upper regulating block 52. Similarly, arrays 50 of thermoelectric temperature control devices are sandwiched between lower surfaces 130 and 132 of the primary block and the lower regulating block 54.

The thermoelectric devices 48, 50 are powered via electrical interconnections 49.

Chilled water is piped through the upper and lower regulating blocks 52, 54 from a completely separate chilled water coolant circuit to either remove or add heat to working fluid in the primary block, depending on the control voltage applied to the arrays of thermoelectric temperature control devices.

Figure 4:
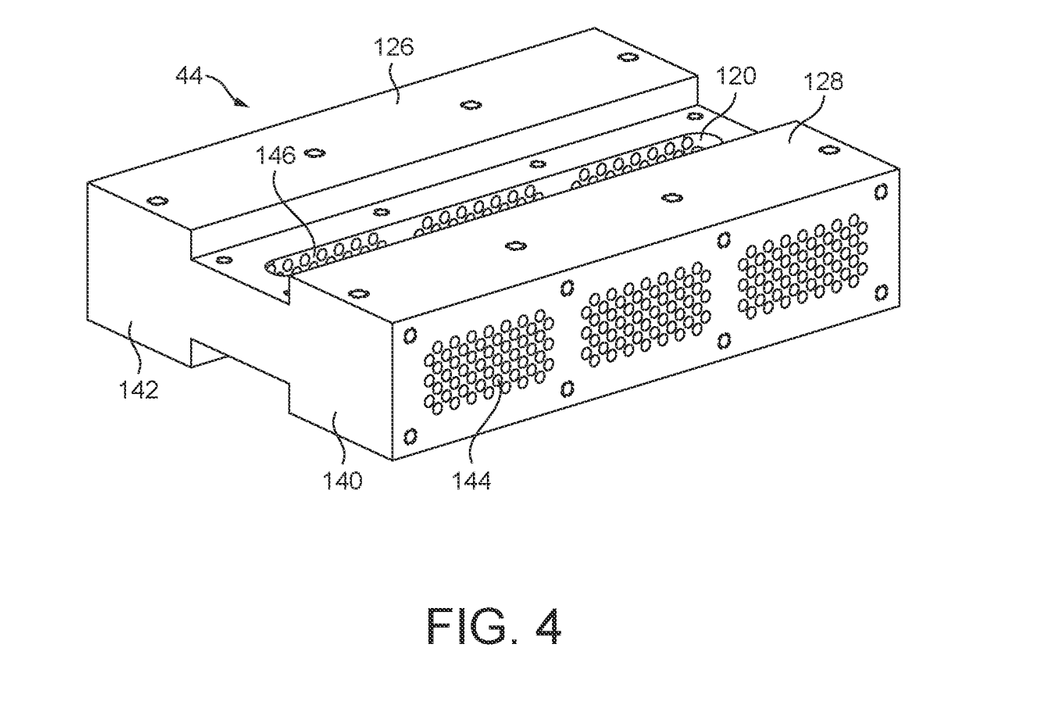
FIG. 4 is a perspective view of the thermal exchanger of the temperature control assembly shown in FIG. 3.

The primary block 44 depicted in FIG. 4 is formed from a block of thermally conductive material. A matrix of holes extends through a first section 140 of the block to form a first set of fluid channels 144. A second matrix of holes extends through a second section 142 of the primary block to form a second set of fluid channels 146. Fluid is therefore able to flow through the first set of channels into the mixing chamber 120 and flow out of the mixing chamber via the second set of channels 146. The mixing chamber 120 avoids plugs of heat being trapped in individual channels. Such a primary block configuration services to provide effective heat transfer with fluids having low thermal penetration depths, which can sometimes be less than 1 mm.

The primary block may be fabricated by machining a solid block of material. Holes may be drilled through the first and second sections 140, 142 to form the first and second sets of fluid channels 144 and 146. Alternatively, the primary block may be formed using an additive manufacturing technique. This may enable structures to be produced which may be difficult to form using conventional machining methods and may allow a greater number of channels (with the channels having a smaller diameter) to be incorporated in a given volume, to provide improved heat transfer properties.

The diameter of the channels is selected to balance pressure drop across the primary block whilst enabling heat transfer to and from the fluid as it flows through the block. The diameter of the holes may typically be 3 mm, which may be suitable for fluids of the range of viscosities and flow rates likely to be used for coolants or bearing fluids in machine tools. For example, the viscosities of such fluids may be in a range from 1 cSt (for coolants) to 50 cSt or greater (for bearing fluids). Holes with larger cross-sections may be suitable for fluids having viscosities greater than 50 cSt. Each fluid channel preferably has a circular cross-section. The channels of each matrix preferably extend parallel to one another.

The assembled primary block may be capable of containing working pressures in excess of 70 bar without causing distortion or deformation that would otherwise allow fluid leakage at the sealing interfaces along the manifolds and blanking plates.

Figure 5:
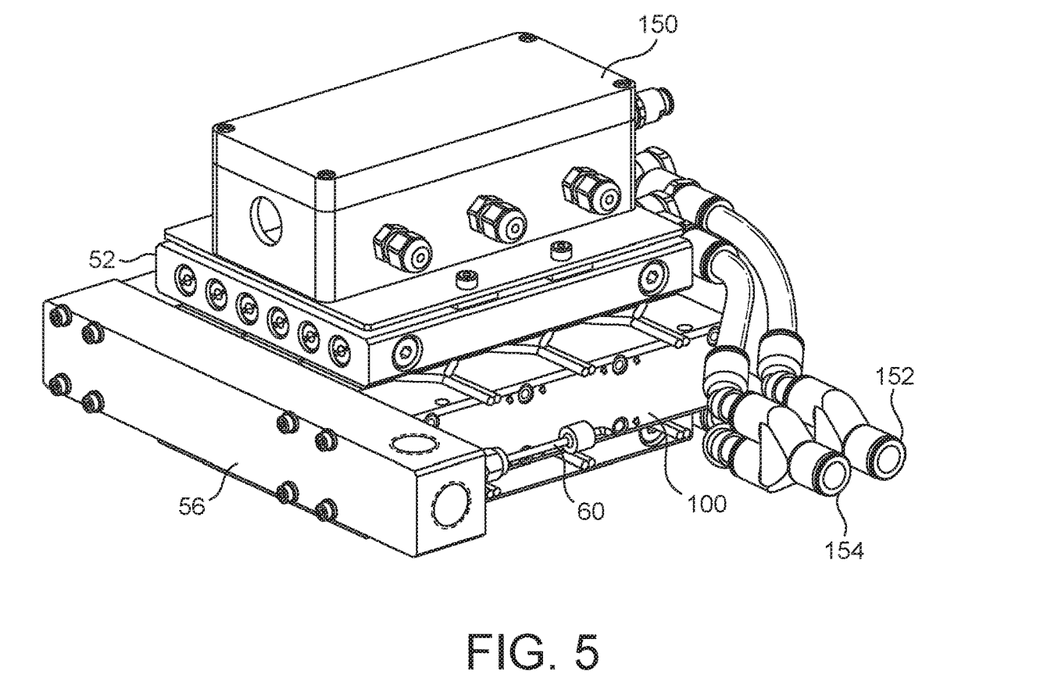
FIGS. 5 to 7 show front perspective, rear perspective and cross-sectional plan views of a temperature control assembly according to an embodiment of the invention.
Figure 6:
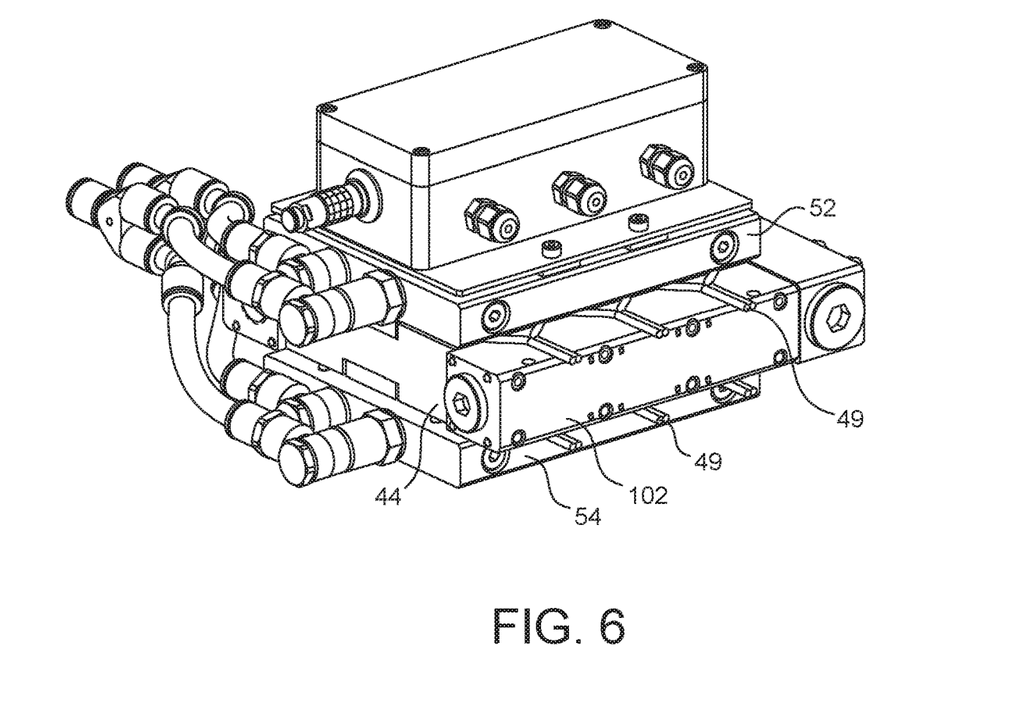
Figure 7:
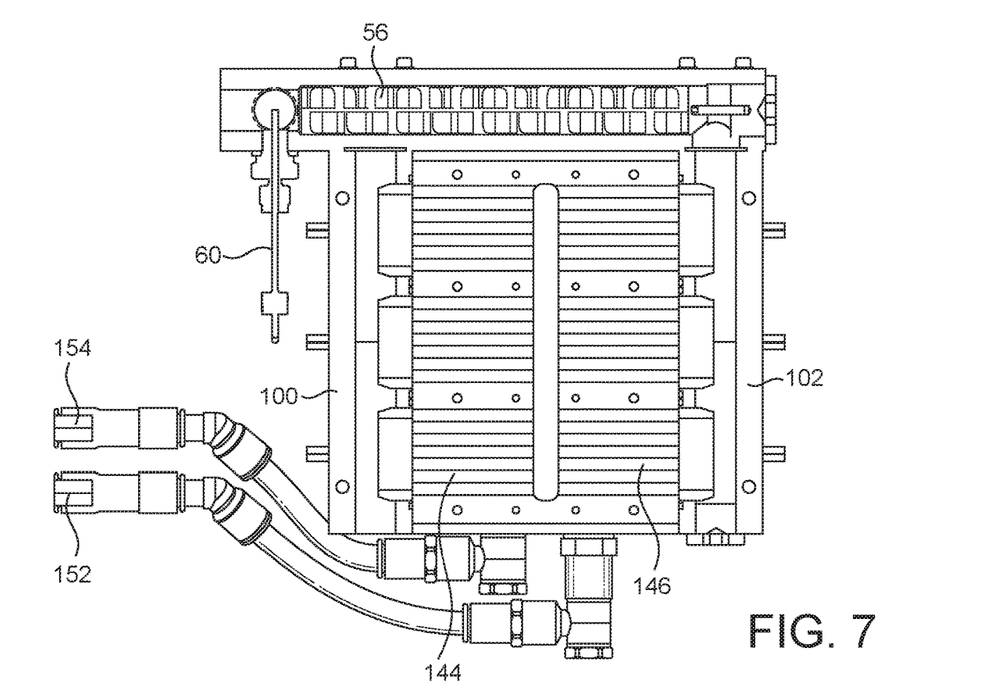

FIGS. 5 to 7 show a temperature control assembly. A drive for arrays of thermoelectric temperature control devices is contained with housing 150 which is mounted on top of regulating block 52. Chilled water is fed to and from the regulating block via a chilled water feed inlet 152 and returned via a chilled water return outlet 154.

Fluid from the outlet manifold 102 passes through a thermal mixing device 56. The mixing device tends to increase the uniformity of temperature across the fluid stream. A temperature sensor, preferably in the form of a thermistor 60 to provide a sufficiently fast response to temperature changes and suitable sensitivity, measures the temperature of the fluid leaving the mixer.

Figure 8:
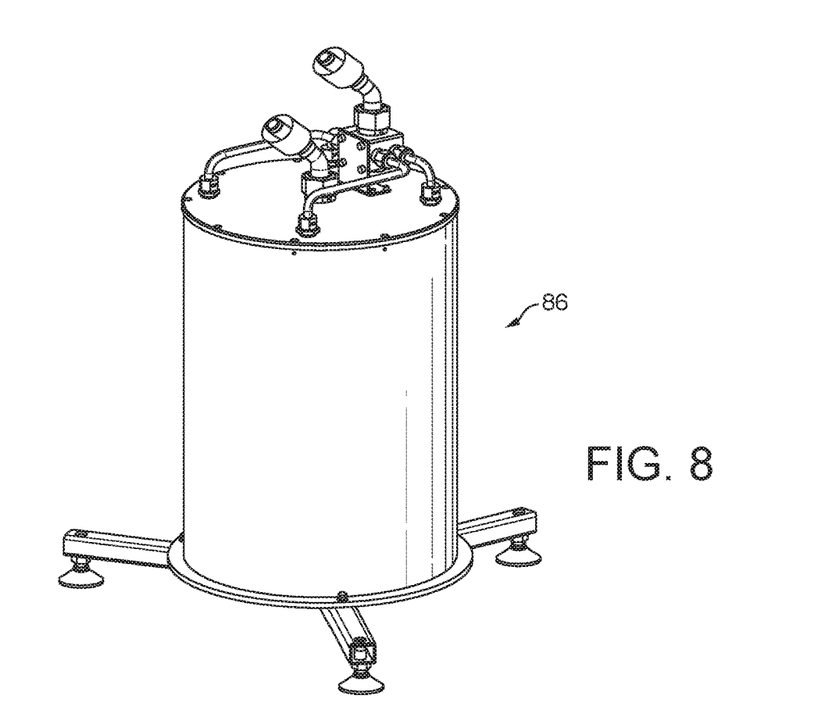
FIGS. 8 and 9 are perspective and plan views of a chilled water heat stabilisation tank according to an embodiment of the invention.
Figure 9:
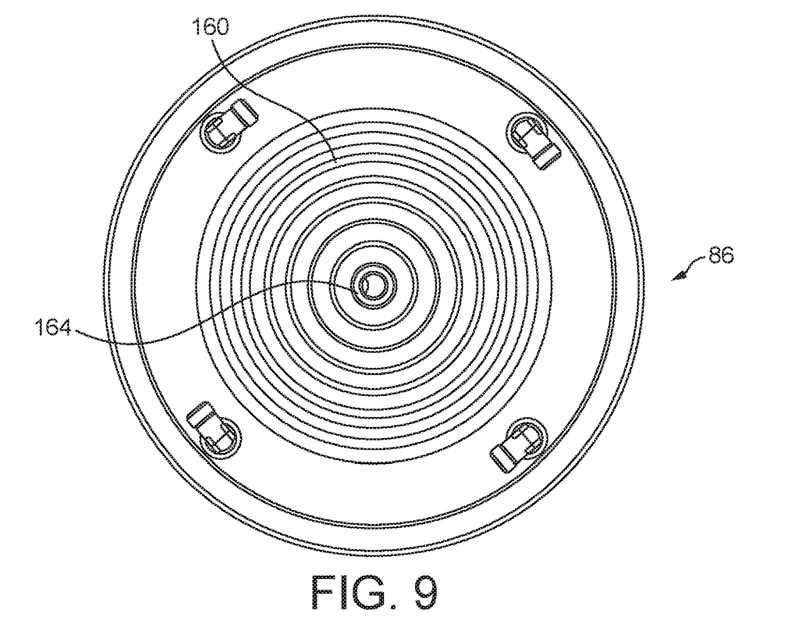
Figure 10:
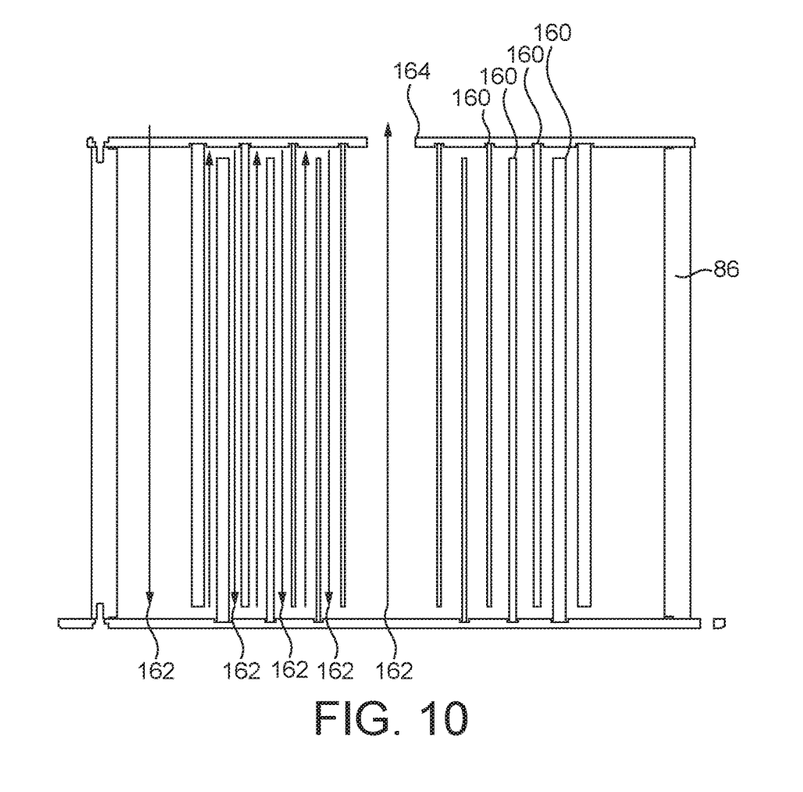
FIG. 10 is cross-sectional side view of the stabilisation tank shown in FIGS. 8 and 9.

The chilled water circuit 80 can optionally be stabilised to a better degree by adding a stabilising chamber 86. An example of such a chamber is shown in FIGS. 8 to 10. The stabilising chamber comprises a cylindrical tank and uses concentric cylinders 160 which are alternately fixed at either their upper or lower ends to one of the inner end walls of the tank. The chilled water is diverted through a labyrinthine path inside the stabilisation tank which is defined by the cylinders, as indicated by arrows 162 in FIG. 10. This configuration serves to minimise any irregularities in the temperature of the chilled water supply. For example, the temperature may be controlled to within +/−0.001° C. If the tank is to support a mass flow rate of 10 litres per minute, then the tank volume may be between 100 and 150 litres. The tank has a chilled water output pipe connection 164.

It will be appreciated that, where reference is made herein to a setpoint temperature, and maintaining fluid at a setpoint temperature, this may refer to a temperature within a tolerance range around a specific temperature. Depending on the accuracy required, the tolerance range may be ±0.01° C. or as small as ±0.001° C. for example.

The invention claimed is:

1. A fluid temperature control apparatus in combination with a machine tool, wherein the apparatus is arranged to adjust a temperature of a fluid being supplied to the machine tool to maintain the fluid at a setpoint temperature at a first location which is downstream of the apparatus, and the apparatus comprises:
    a temperature control assembly for adjusting the temperature of the fluid as it passes through the assembly, the assembly having a fluid inlet for receiving a flow of the fluid and a fluid outlet for outputting the fluid;
    a fluid conduit arrangement which is coupled to the fluid outlet to carry the fluid to the machine tool;
    a first temperature sensor for outputting a first temperature signal responsive to the temperature of the fluid at the first location; and
    a controller configured to receive the first temperature signal and control the temperature control assembly with reference to the first temperature signal so as to maintain the fluid at the setpoint temperature at the first location,
    wherein the temperature control assembly comprises at least one thermoelectric temperature control device, and the temperature control assembly includes a thermal exchanger, and the thermal exchanger forms part of a fluid path between the fluid inlet and the fluid outlet, is thermally coupled to the at least one thermoelectric temperature control device, and defines a first set of channels in the fluid path between the fluid inlet and the fluid outlet, with the fluid path divided between the first set of channels.

2. The combination of claim 1, wherein the thermal exchanger defines a second set of channels in the fluid path between the fluid inlet and the fluid outlet, the second set of channels is downstream of the first set of channels, the fluid path is divided between the second set of channels, and the thermal exchanger includes a mixing chamber located in the fluid path between the first and second sets of channels.

3. The combination of claim 1, wherein the apparatus includes a fluid mixing device which is downstream of the thermal exchanger and upstream of the first location.

4. The combination of claim 1, wherein the temperature control assembly includes a temperature regulator for removing heat from the at least one thermoelectric temperature control device, and the at least one thermoelectric temperature control device is thermally coupled between the thermal exchanger and the temperature regulator.

5. The combination of claim 4, wherein the temperature regulator is fluidically coupled to a coolant fluid path for carrying coolant fluid to and from the temperature regulator.

6. The combination of claim 5, including a stabilising chamber in the coolant fluid path at a location upstream of the temperature regulator, wherein the stabilising chamber is arranged to increase uniformity of the temperature of coolant fluid flowing into the temperature regulator.

7. The combination of claim 1, wherein the controller is configured to receive an input signal responsive to an operating parameter of the machine tool, and to adjust the setpoint temperature with reference to the input signal.

8. The combination of claim 7, wherein the operating parameter is dependent on a speed of a moving element of the machine tool.

9. A machine tool system including the combination of claim 1, wherein the system further includes a fluid return path for carrying fluid from the machine tool to the fluid inlet.

10. The system of claim 9, including a heat exchanger in the fluid return path for transferring heat energy to or from fluid flowing along the fluid return path.

11. The system of claim 10, wherein the temperature control assembly includes a thermal exchanger which forms part of a fluid path between the fluid inlet and the fluid outlet, and is thermally coupled to the at least one thermoelectric temperature control device, wherein the temperature control assembly includes a temperature regulator for removing heat from the at least one thermoelectric temperature control device, wherein the at least one thermoelectric temperature control device is thermally coupled between the thermal exchanger and the temperature regulator, wherein the temperature regulator is fluidically coupled to a coolant fluid path for carrying coolant fluid to and from the temperature regulator, and wherein the coolant fluid path includes a valve for selectively diverting a proportion of the coolant fluid flowing along the coolant fluid path to the heat exchanger to receive heat energy drawn from fluid flowing along the fluid return path.

12. The system of claim 11, including a valve controller for adjusting the valve, wherein the valve controller is configured to receive a valve control signal responsive to an operating parameter of the machine tool, and to adjust the valve with reference to the valve control signal.

13. The system of claim 12, wherein the operating parameter is dependent on a speed of a moving element of the machine tool.

14. The system of claim 9, including a second temperature sensor for outputting a second temperature signal responsive to the temperature of the fluid at a second location which is in the fluid return path.

15. The system of claim 14, wherein the controller is configured to receive the first and second temperature signals and control the assembly with reference to the first and second temperature signals so as to maintain the fluid at the setpoint temperature at the first location.

16. The system of claim 9, including a fluid pump in the fluid return path.

17. A method of using the combination of claim 1 to adjust the temperature of the fluid being supplied to the machine tool to maintain the fluid at the setpoint temperature at the first location downstream of the fluid temperature control apparatus, comprising the steps of:
receiving the flow of the fluid in the fluid inlet of the temperature control assembly;
heating or cooling the fluid flow with the temperature control assembly such that the setpoint temperature is maintained at the first location; and
feeding the fluid flow to the machine tool,
wherein the fluid is heated or cooled using the at least one thermoelectric temperature control device.

18. The combination of claim 1, wherein the at least one thermoelectric temperature control device is operatively coupled to surfaces of the thermal exchanger.

19. A fluid temperature control apparatus in combination with a machine tool, wherein the apparatus is arranged to adjust a temperature of a fluid being supplied to the machine tool to maintain the fluid at a setpoint temperature at a first location which is downstream of the apparatus, and the apparatus comprises:
a temperature control assembly for adjusting the temperature of the fluid as it passes through the assembly, the assembly having a fluid inlet for receiving a flow of the fluid and a fluid outlet for outputting the fluid;
a fluid conduit arrangement which is coupled to the fluid outlet to carry the fluid to the machine tool;
a first temperature sensor for outputting a first temperature signal responsive to the temperature of the fluid at the first location;
a controller configured to receive the first temperature signal and control the temperature control assembly with reference to the first temperature signal so as to maintain the fluid at the setpoint temperature at the first location;
a fluid return path for carrying fluid from the machine tool to the fluid inlet;
a heat exchanger in the fluid return path for transferring heat energy to or from fluid flowing along the fluid return path; and
wherein the temperature control assembly comprises at least one thermoelectric temperature control device and a thermal exchanger, and the thermal exchanger forms part of a fluid path between the fluid inlet and the fluid outlet and is thermally coupled to the at least one thermoelectric temperature control device, wherein the temperature control assembly includes a temperature regulator for removing heat from the at least one thermoelectric temperature control device, wherein the at least one thermoelectric temperature control device is thermally coupled between the thermal exchanger and the temperature regulator, wherein the temperature regulator is fluidically coupled to a coolant fluid path for carrying coolant fluid to and from the temperature regulator, and wherein the coolant fluid path includes a valve for selectively diverting a proportion of the coolant fluid flowing along the coolant fluid path to the heat exchanger to receive heat energy drawn from fluid flowing along the fluid return path; and
wherein the apparatus further comprises a valve controller for adjusting the valve, wherein the valve controller is configured to receive a valve control signal responsive to an operating parameter of the machine tool, and to adjust the valve with reference to the valve control signal.

20. The combination of claim 19, wherein the operating parameter is dependent on a speed of a moving element of the machine tool.

* * * * *